US 8,651,552 B2

(12) United States Patent
Shibutake et al.

(10) Patent No.: US 8,651,552 B2
(45) Date of Patent: Feb. 18, 2014

(54) SUPPORT STRUCTURE OF WINDSHIELD

(75) Inventors: Nobuyuki Shibutake, Hiroshima (JP);
Toshiharu Ikeda, Hiroshima (JP);
Yoshikazu Ide, Hiroshima (JP); Hiroshi Sogabe, Hiroshima (JP); Yasuhiko Nishida, Hiroshima (JP); Naoki Shibata, Aichi (JP); Kohji Hashida, Hiroshima (JP); Toshinori Toyohara, Hiroshima (JP); Nobuhiko Yokoyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 123 days.

(21) Appl. No.: 13/195,643

(22) Filed: Aug. 1, 2011

(65) Prior Publication Data
US 2012/0032468 A1 Feb. 9, 2012

(30) Foreign Application Priority Data

Aug. 3, 2010 (JP) .................................. 2010-174282
May 13, 2011 (JP) .................................. 2011-107859

(51) Int. Cl.
*B60J 1/02* (2006.01)
*B62D 25/08* (2006.01)

(52) U.S. Cl.
USPC ........................ 296/96.21; 296/192; 296/201

(58) Field of Classification Search
USPC .................. 296/96.21, 187.04, 201, 187.09, 296/193.02, 203.02, 192
See application file for complete search history.

(56) References Cited

U.S. PATENT DOCUMENTS

| | | | | |
|---|---|---|---|---|
| 4,146,263 A * | 3/1979 | Watari | ....................... | 296/96.21 |
| 6,193,304 B1 * | 2/2001 | Takahashi et al. | ............. | 296/192 |
| 6,193,305 B1 * | 2/2001 | Takahashi | ....................... | 296/192 |
| 6,644,725 B2 * | 11/2003 | Braitmaier et al. | ....... | 296/203.03 |
| 6,869,134 B2 * | 3/2005 | Kato et al. | ..................... | 296/192 |
| 7,004,534 B2 * | 2/2006 | Yoshii et al. | ................... | 296/192 |
| 7,267,394 B1 * | 9/2007 | Mouch et al. | ............. | 296/203.02 |
| 7,357,446 B2 * | 4/2008 | Sakai et al. | .................... | 296/192 |
| 7,540,557 B2 * | 6/2009 | Shimura | ........................ | 296/192 |
| 7,552,964 B2 * | 6/2009 | Saito | ............................. | 296/192 |
| 7,594,692 B2 * | 9/2009 | Shishido | ................. | 296/203.02 |
| 7,731,272 B2 * | 6/2010 | Moore et al. | ............. | 296/187.09 |
| 2009/0195027 A1 * | 8/2009 | Heck et al. | ..................... | 296/192 |

FOREIGN PATENT DOCUMENTS

JP 2007-331720 A 12/2007
JP 2009-006801 A 1/2009

* cited by examiner

*Primary Examiner* — Glenn Dayoan
*Assistant Examiner* — Sunsurraye Westbrook
(74) *Attorney, Agent, or Firm* — Studebaker & Brackett PC

(57) ABSTRACT

A support structure of a windshield of the present invention comprises a frame having an open section opening forward in a vehicle and a support member provided inside the frame and connecting an upper face portion and a lower face portion of the frame. The frame has a windshield support portion supporting a lower side portion of the windshield at part of the upper face portion. The support member includes a rear support portion attached to the upper face portion of the frame and a front support portion attached to a cowl panel at a specified location positioned in front of the rear support portion. The windshield support portion is positioned between the front and rear support portions in the vehicle longitudinal direction.

13 Claims, 16 Drawing Sheets

FIG. 12

SUPPORT STRUCTURE OF WINDSHIELD

BACKGROUND OF THE INVENTION

The present invention relates to a support structure of a windshield which comprises a frame having an open section opening forward in a vehicle and extending in a vehicle width direction along a lower side portion of the windshield and a support member provided inside the frame and connecting an upper face portion and a lower face portion of the frame.

Conventionally, some structures disclosed in Japanese Patent Laid-Open Publications No. 2007-331720, 2009-6801 and US Patent Application Publication No. 2008/116721 are known as a structure supporting a windshield (a glass-made windshield, for example).

In the structure disclosed in the above-described first patent document, as shown in FIG. 14, the cowl outer panel 61 and the cowl inner panel 62 constitute the cowl portion 63, and the cowl outer panel 61 supports the windshield glass 65 via the adhesive 64. The brace 66 is provided to face the lower front face of the cowl inner panel 62 and the front back face of the cowl outer panel 61, and the closed cross section 67 is formed among the brace 66, the cowl inner panel 62, and the cowl outer panel 61, so that the support rigidity of the windshield 65 is increased to reduce the noises and vibrations and thereby to ensure the NV (noise vibration) function. Further, the bending portion 66a is formed at the middle portion, in the vertical direction, of the brace 66, so that deformation of the brace 66 at the bending portion 66a is promoted when the impact load is inputted from above. Thereby, the protection of a pedestrian who the vehicle hits against from the front (in the vehicle frontal collision) is achieved. In FIG. 14, an arrow F shows a vehicle forward direction. This is the same in FIGS. 15 and 16 as well.

In the conventional structure shown in FIG. 14, while there is an advantage that both the NV function and the pedestrian protection function can be ensured, there is a problem in that since the closed cross section 67 is formed inside the cowl portion 63 by using the brace 66, the layout around the cowl portion 63 may be restricted.

In the structure disclosed in the above-described second patent document, as shown in FIG. 15, the cowl outer panel 71 and the cowl inner panel 72 constitute the cowl portion 73 with an open cross section, and the cowl outer panel 71 supports the windshield glass 75 via the adhesive 74. The panel member 76 is provided at the lower portion of the cowl inner panel 72, and the reinforcement 77 extending vertically is provided between the upper face of the rear portion of the panel member 76 and the back face of the front portion of the cowl outer panel 71. Thereby, the rigidity of the cowl portion 73 in the vertical direction can be ensured to improve the NV function.

In the conventional structure shown in FIG. 15, while it may be possible to ensure the NV function with the high rigidity of the cowl portion, another countermeasure for the pedestrian protection against the vehicle frontal collision may be necessary. That is, in the conventional structure of FIG. 15, there is a problem in that some means for bending or deforming the reinforcement 77 when the impact load is inputted from above, such as providing the airbag device 78 shown in the figure, may be indispensable for the pedestrian protection, so that the structure may become improperly complex.

In the structure disclosed in the above-described third patent document, as shown in FIG. 16, the cowl outer panel 81 and the cowl inner panel 82 constitute the cowl portion 83, and the cowl outer panel 81 supports the windshield glass 85 via the adhesive 84. The bending portion 86a is formed at the middle position, in the vertical direction, of the brace 86 which is provided between the front face of the lower portion of the cowl inner panel 82 and the lower face of the front portion of the cowl outer panel 81. When the impact load is inputted from above, the deformation of the brace 86 at the bending portion 86a can be promoted to achieve the pedestrian protection.

In the conventional structure shown in FIG. 16, while there is an advantage in that the pedestrian protection function can be ensured, there is a problem in that the NV function may deteriorate. That is, since the support portion supporting the lower face of the cowl outer panel 81 is comprised of a single point of the bending portion 86b with a small longitudinal width which is formed at the upper end of the brace 86, there is a problem in that a force acting on the windshield glass 85 during the vehicle traveling (which is cased by the traveling air or the like) may cause a film vibration of the windshield 85 like a drum, so that a sound caused by this film vibration may be sensed in error as a noise in the vehicle compartment.

SUMMARY OF THE INVENTION

The present invention has been devised in view of the above-described problems, and an object of the present invention is to provide a support structure of a windshield which can properly ensure both the NV function and the pedestrian protection function.

According to the present invention, there is provided a support structure of a windshield, comprising a frame having an open section opening forward in a vehicle and extending in a vehicle width direction along a lower side portion of the windshield, and a support member provided inside the frame and connecting an upper face portion and a lower face portion of the frame, wherein the frame has a windshield support portion supporting the lower side portion of the windshield at part of the upper face portion thereof, the support member includes a rear support portion attached to the upper face portion of the frame and a front support portion attached to the upper face portion of the frame at a specified location positioned in front of the rear support portion, and the windshield support portion of the frame is positioned between the front and rear support portions of the support member in a vehicle longitudinal direction.

According to the present invention, since the windshield support portion supporting the windshield is provided at the upper face portion of the frame having the open section opening forward, the upper face portion of the frame deforms easily in the vehicle frontal collision (when the pedestrian is pushed up onto the windshield), so that the pedestrian protection function can be ensued properly. Herein, since the support member includes the front and rear support portions, as the portions supporting the upper face portion of the frame, which are positioned away from each other in the vehicle longitudinal direction, a specified gap (space) is formed between these support portions, so that the downward deformation of the upper face portion of the frame can be promoted properly. Further, since the upper face portion of the frame is supported at the plural positions (front and rear support portions) as described above, in a non-collision state (a normal state) in which no impact load is inputted to the windshield, vibrations of the windshield and the cowl panel are reduced, so that it can be properly restrained that noises are generated in the vehicle compartment. Thus, both the NV function and the pedestrian protection function can be properly ensured.

According to an embodiment of the present invention, the support member extends straightly in a vertical direction in an elevational view. Thereby, the support member can provide the strong structure against the vertical vibrations occurring in the vertical direction and effectively restrain the vibration of the windshield in the non-collision state (in the normal state).

According to another embodiment of the present invention, the upper face portion of the frame includes a first wall portion to which the rear support portion of the support member is attached and a second wall portion which extends forward from the first wall portion and to which the front support portion of the support member is attached, a bending portion having a specified cross angle is formed at a connection portion of the first wall portion and the second wall portion, and the bending portion is positioned between the front and rear support portions of the support member in the vehicle longitudinal direction. Thereby, since the second wall portion of the frame easily bends downward at the bending portion in the vehicle frontal collision, the pedestrian protection function can be improved further.

According to another embodiment of the present invention, the windshield support portion is formed by part of a rear side portion of the second wall portion, the front support portion is attached to a specified portion of the second wall portion which is positioned in front of the windshield support portion, and the specified portion of the second wall portion to which the front support portion is attached is formed at a specified location below the windshield support portion. Thereby, the downward deformation of the windshield support portion is not obstructed by the front portion of the second wall portion in the vehicle frontal collision, so that the deformation of the upper face portion of the frame including the windshield support portion can be promoted more effectively.

According to another embodiment of the present invention, the support member has a frame portion extending obliquely rearward and downward from the upper face portion to the lower face portion of the frame, and an extension direction of the frame portion matches an input direction of a load caused by a film vibration of the windshield. Thereby, the vibration load inputted from the windshield in the non-collision state (normal state) can be efficiently absorbed by the frame portion arranged in parallel to the input direction of this load, so that the vibration reduction can be achieved more effectively.

According to another embodiment of the present invention, the upper face portion of the frame includes a first wall portion to which the rear support portion of the support member is attached, a second wall portion which extends forward from the first wall portion and to which the front support portion of the support member is attached, and a third wall portion which extends downward from a rear end portion of the first wall portion and is formed at a specified location in back of a rear side portion of the support member. Thereby, since the space is formed between the third wall portion of the frame and the rear side portion of the support member, the deformations of the frame and the support member in the vehicle frontal collision can be promoted. Further, a passage of air for air conditioning can be provided by this space.

According to another embodiment of the present invention, the upper face portion of the frame includes a first wall portion to which the rear support portion of the support member is attached, a second wall portion which extends forward from the first wall portion and to which the front support portion of the support member is attached, and a third wall portion which extends downward from a rear end portion of the first wall portion, and a bending portion having an acute cross angle is formed at a connection portion of the first wall portion and the third wall portion. Thereby, since the frame deforms more easily at the bending portion with the acute cross angle, the pedestrian protection function can be further improved.

According to another embodiment of the present invention, the support member includes a rear frame portion extending obliquely forward and downward from the rear support portion with a specified gap formed vertically between the third wall portion and the rear frame portion, and a front frame portion extending downward from the front support portion. Thereby, since the properly large space is formed between the rear frame portion and the third wall portion, the deformations of the frame and the support member in the vehicle frontal collision can be promoted more effectively.

According to another embodiment of the present invention, the upper and lower face portions of the frame are a cowl panel and a dash upper panel, the front and rear support portions of the support member are respectively attached to front and rear points of the cowl panel which are positioned above a connection portion of the cowl panel and the dash upper panel, and a lower end portion of the support member is attached to a specified portion of the dash upper panel which is positioned below the connection portion of the cowl panel and the dash upper panel. Thereby, since the vertical rigidity of the frame (the cowl panel and the dash upper panel) is ensured sufficiently, the vibration of the windshield and the like can be reduced more effectively in the non-collision state (normal state).

According to another embodiment of the present invention, the support member is provided at a middle position, in the vehicle width direction, of the frame, a pair of assistant members is provided at both side portions of the frame which are positioned on the outside, in the vehicle width direction, of the support member, each of the assistant members including a lower end portion attached to the connection portion of the cowl panel and the dash upper panel and an upper end portion attached to a specified portion of the cowl panel which is positioned above the connection portion of the cowl panel and the dash upper panel. Thereby, in case the vibration load at the middle position where the relatively large vibration of the windshield occurs is supported by the support member, whereas the vibration load at the side position where the relatively small vibration of the windshield occurs is supported by the assistant member, the vibration of the windshield can be reduced efficiently in the non-collision state (normal state).

According to another embodiment of the present invention, the support member is comprised of a plate member which is arranged such that a direction of plate thickness thereof is parallel to the vehicle width direction, and the assistant member is comprised of another plate member which is arranged such that a direction of plate thickness thereof is perpendicular to the vehicle width direction. Thereby, in case the plural plate members with different directions are arranged at the plural positions in the vehicle width direction as the support member and the assistant member, the vibration of the windshield can be reduced more effectively.

According to another embodiment of the present invention, the support member has a bending portion at a middle position thereof in a vertical direction such that the support member bends in the vehicle width direction at the bending portion when an impact load is inputted to the windshield from above. Thereby, the deformation of the frame (the cowl panel) is further prompted, so that the pedestrian protection function can be further improved.

Other features, aspects, and advantages of the present invention will become apparent from the following description which refers to the accompanying drawings.

BRIEF DESCRIPTION OF THE DRAWINGS

FIG. 12 is a side view showing a third embodiment of the support structure of the windshield.

DETAILED DESCRIPTION OF THE INVENTION

Hereinafter, preferred embodiments of the present invention will be descried referring to the accompanying drawings.

Figure 1:
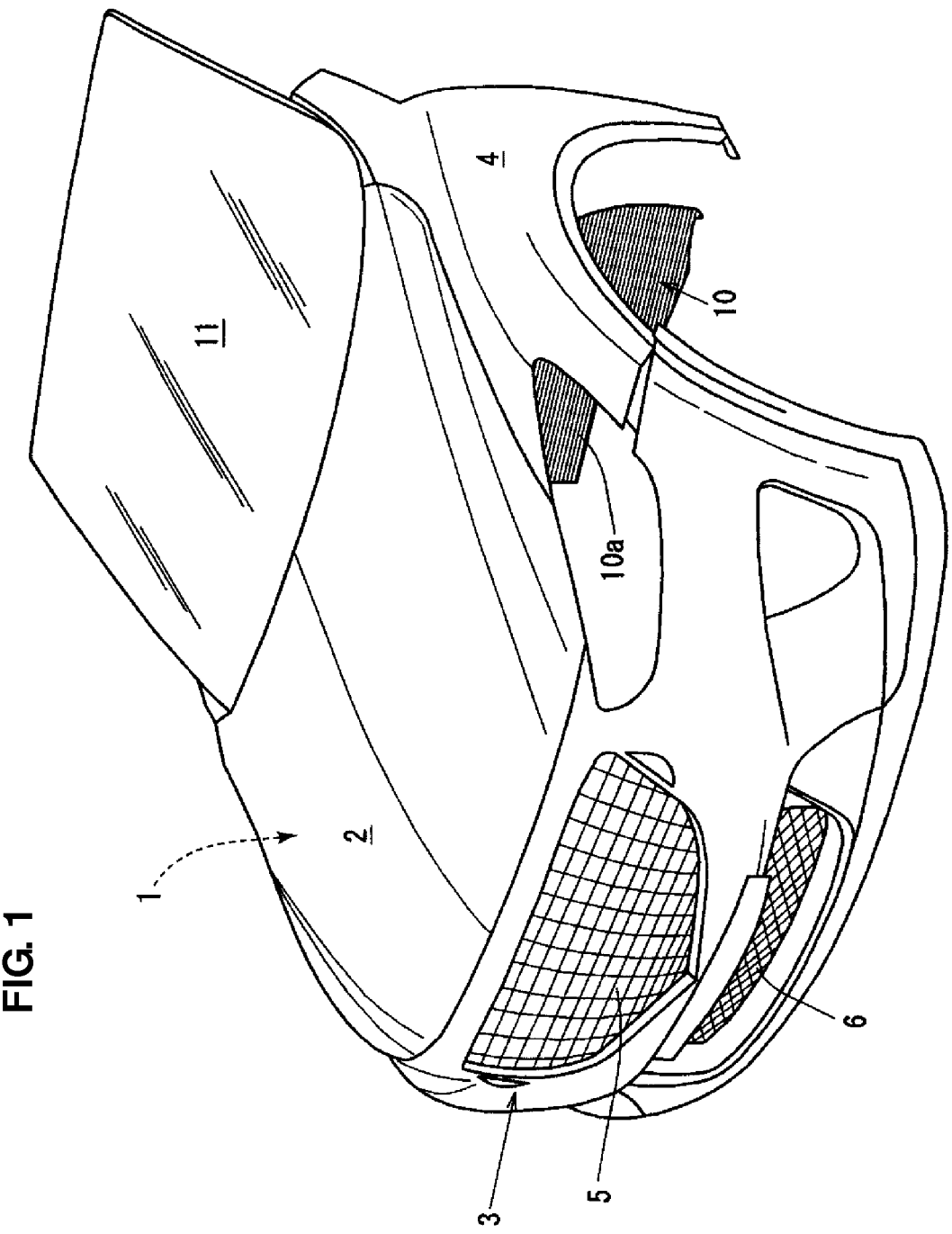
FIG. 1 is a perspective view of a vehicle front portion equipped with a support structure of a windshield according to a first embodiment of the present invention.
Figure 2:
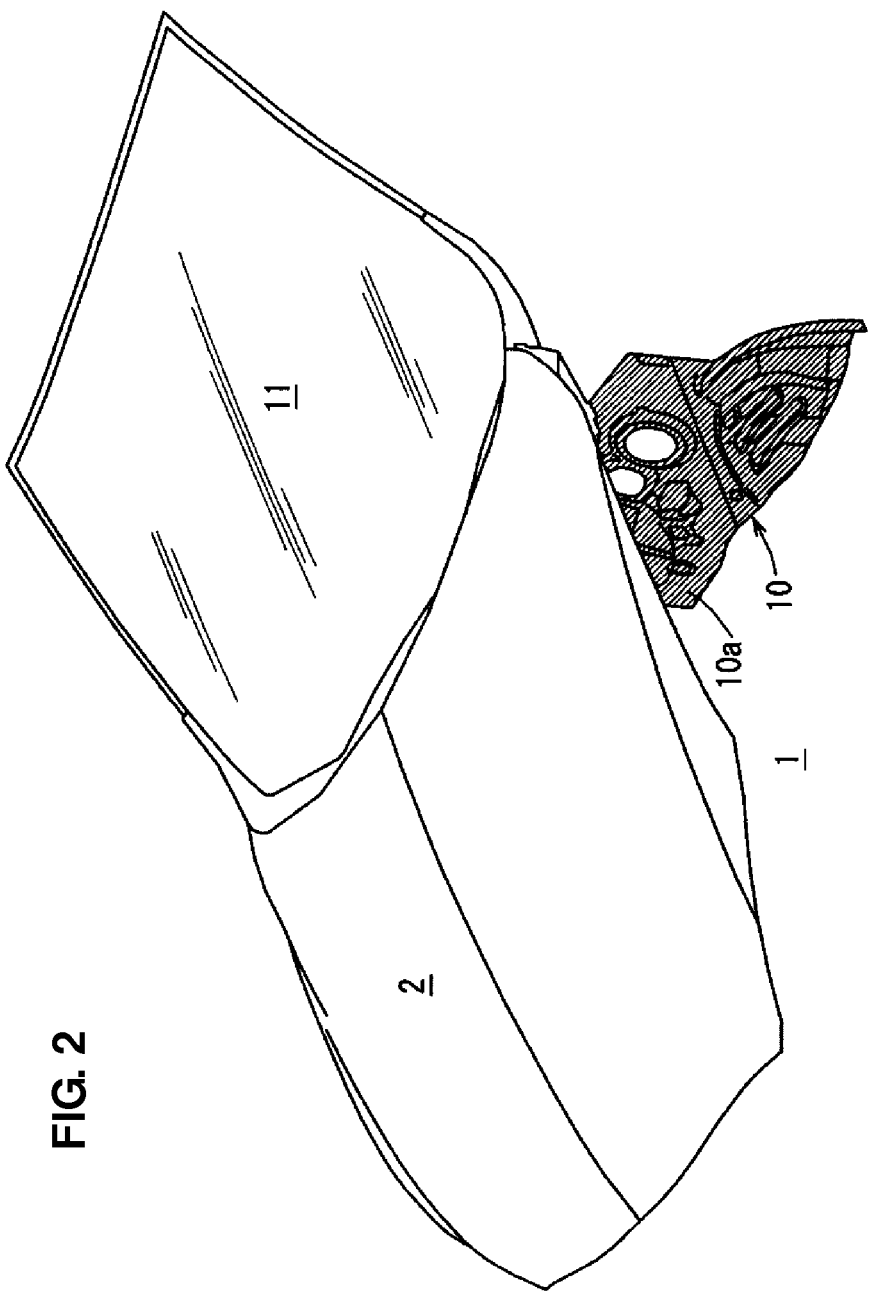
FIG. 2 is a partial perspective view of FIG. 1.
Figure 3:
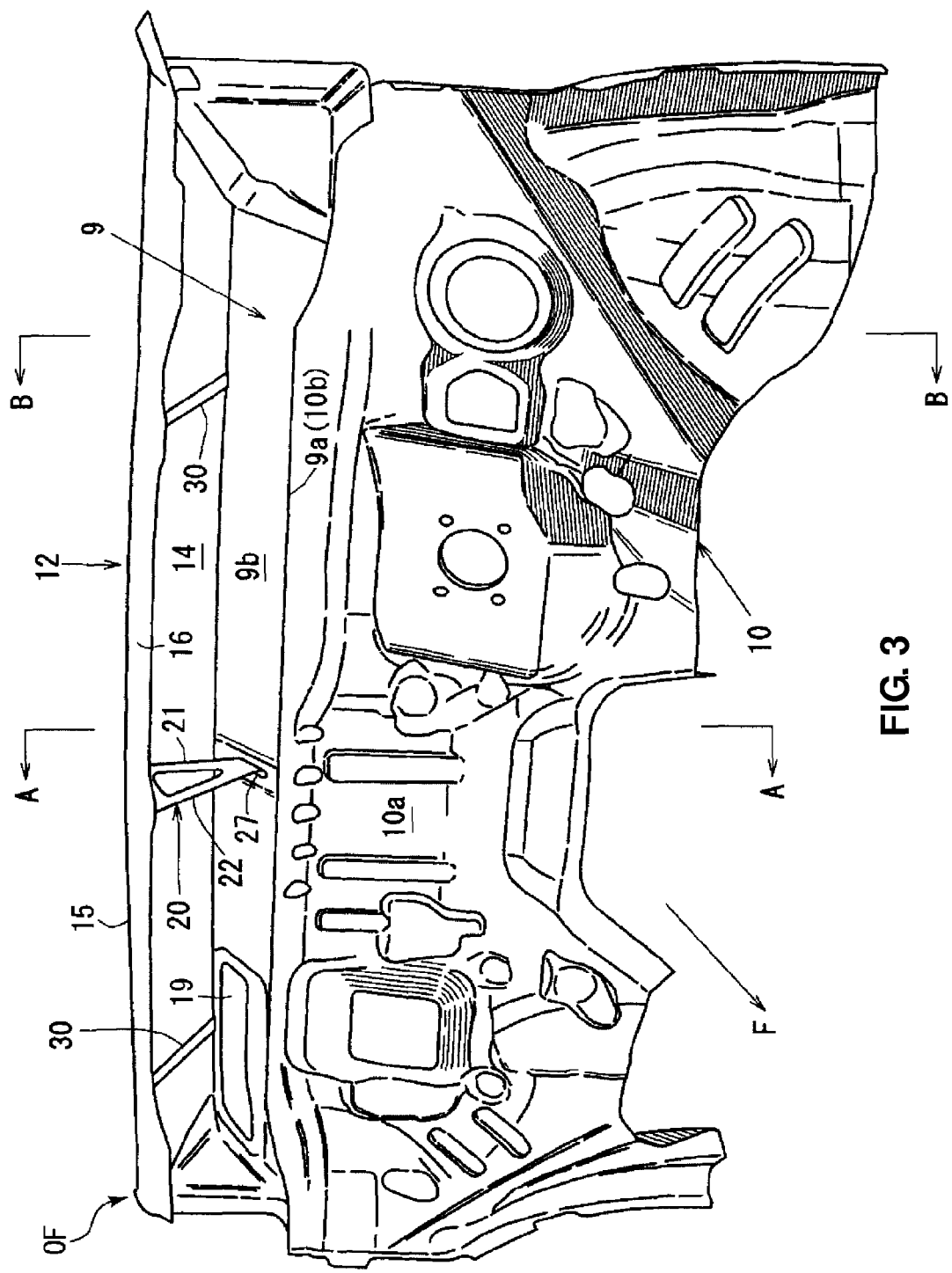
FIG. 3 is a perspective view showing the support structure of the windshield.
Figure 4:
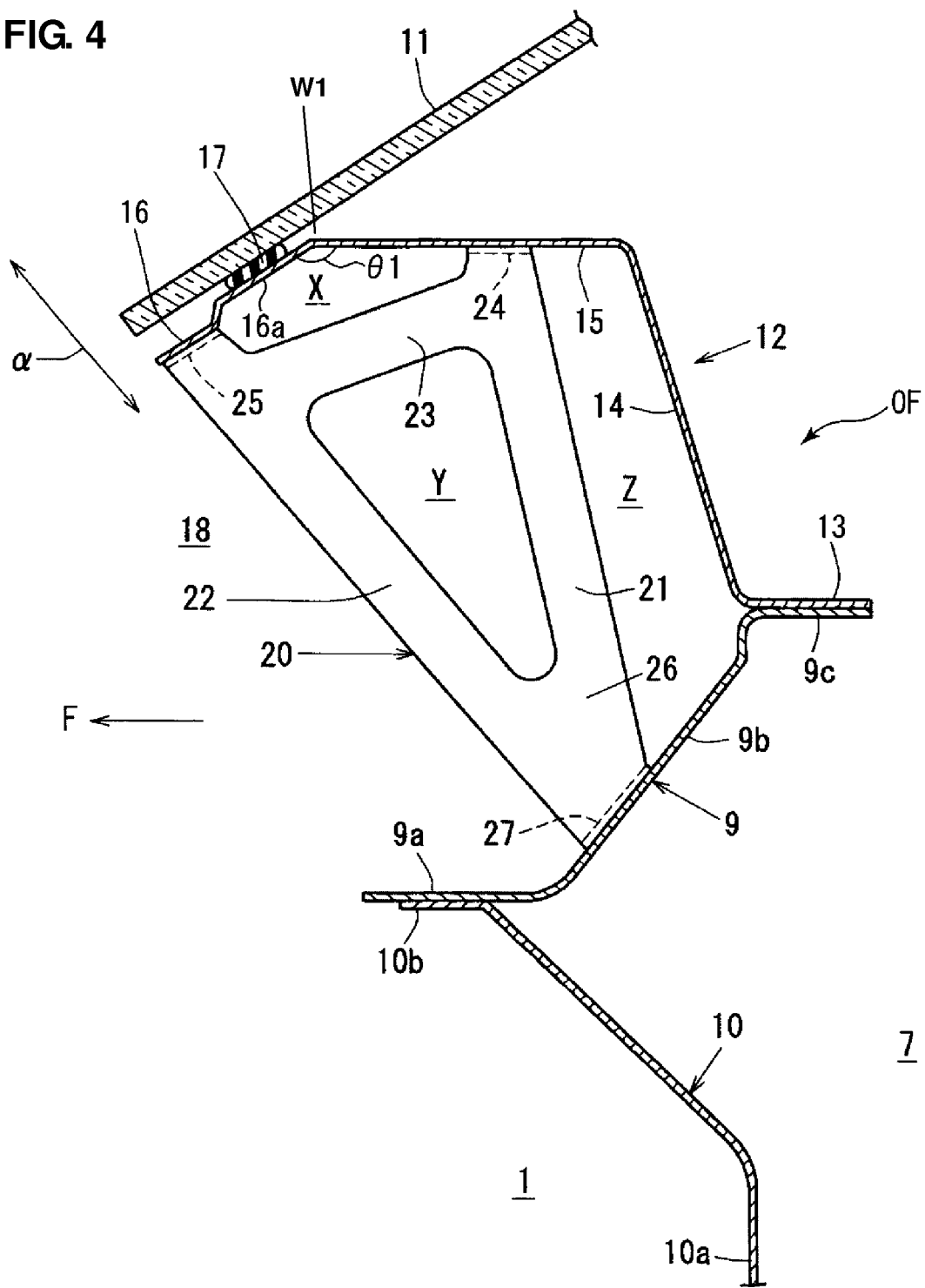
FIG. 4 is a sectional view taken along line A-A of FIG. 3.
Figure 5:
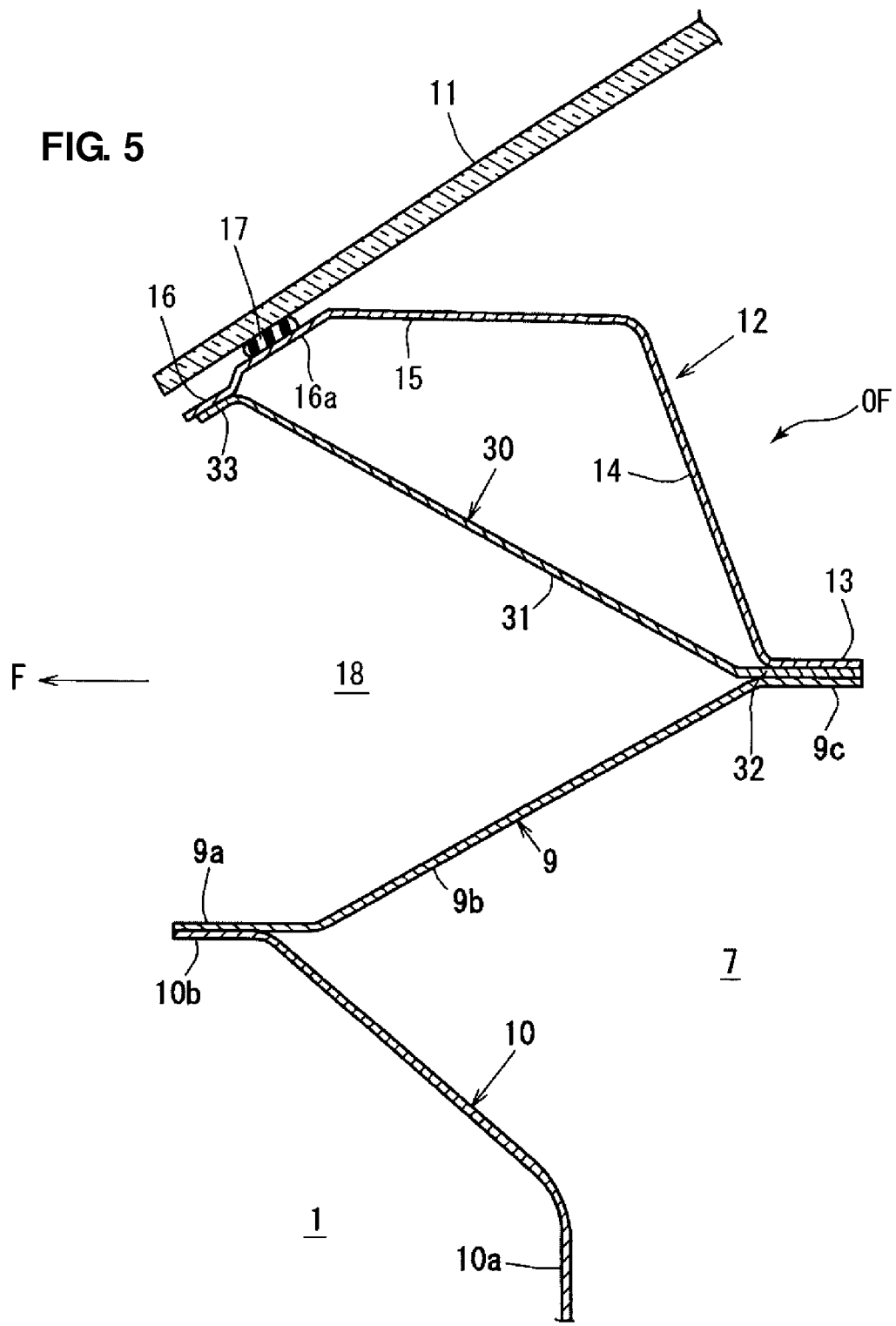
FIG. 5 is a sectional view taken along line B-B of FIG. 3.

FIG. 1 is a perspective view of a vehicle front portion equipped with a support structure of a windshield according to a first embodiment of the present invention. FIG. 2 is a partial perspective view of FIG. 1. FIG. 3 is a perspective view showing the support structure of the windshield. FIG. 4 is a sectional view taken along line A-A of FIG. 3. FIG. 5 is a sectional view taken along line B-B of FIG. 3. Herein, an arrow F shows a vehicle forward direction.

As shown in FIGS. 1 and 2, at a front portion of a vehicle is provided an engine hood 2 which covers over an engine room 1 to open or close an upper portion of the engine room 1, and an engine-hood reinforcement (not illustrated) is joined to a lower (back) face of the engine hood 2.

Further, as shown in FIG. 1, at a front portion in the engine room 1 is provided a bumper face 3 to form an outer surface of a front bumper, and at side portions in the engine room 1 is provided a pair of front fender panels 4 which extends rearward from both-side end portions of the bumper face 3. Each front fender panel 4 extends longitudinally along a side portion of the engine hood 2, and its rear end portion extends vertically to cover over a space between a lower portion of a front pillar (not illustrated) and a front portion of a hinge pillar (not illustrated). The bumper face 3 is made of a resin-made panel member extending in a vehicle width direction, and at its central portion are formed inlet portions 5, 6 for traveling air.

A windshield 11, which is made of a glass-made or reinforced-plastic-made transparent panel member, for example, is provided in back of the engine hood 2. The windshield 11 extends in the vehicle width direction to cover over a space between the pair of front pillars (not illustrated) and rises obliquely upward and rearward from the vicinity of a rear end of the engine hood 2.

Further, as shown in FIGS. 4 and 5, a dash lower panel 10 is provided to partition a vehicle compartment 7 from the engine room 1 longitudinally, and a dash upper panel 9 is arranged above the dash lower panel 10.

These dash upper and lower panels 9, 10 are made of a panel member, respectively, each of which extends in the vehicle width direction over an almost entire area as shown in FIG. 3. The dash lower panel 10 comprises a body portion 10a which extends vertically and a flange-shaped attachment piece 10b which extends forward from an upper end portion of the body portion 10a.

The dash upper panel 9, as shown in FIGS. 4 and 5, comprises a flat-shaped attachment piece 9a which is joined to the attachment piece 10b of the dash lower panel 10 by welding, a body portion 9b which rises obliquely rearward and upward from a rear end of the attachment piece 9a, and a flange-shaped attachment piece 9c which extends rearward from a rear end of the body portion 9b.

Herein, an inlet port for conditioning air 19 is, as shown in FIG. 3, formed at a one-end portion, in the vehicle width direction, (right-side end portion in the present embodiment) of the body portion 9b of the dash upper panel 9.

A cowl panel 12 which supports the windshield 11 from the vehicle-compartment inside is attached to an upper side of the dash upper panel 9.

The cowl panel 12, which is a panel member extending in the vehicle width direction along a lower side portion of the windshield 11, comprises a flat-shaped attachment piece 13 which is joined to the attachment piece 9c of the dash upper panel 9 by welding, a rise portion 14 which extends obliquely upward and forward from a front end portion of the attachment piece 13, a horizontal portion 15 which extends forward from an upper end portion of the rise portion 14, and an extension portion 16 which extends obliquely downward and forward from a front end portion of the horizontal portion 15. The horizontal portion 15 and the extension portion 16 are connected to each other via a bending portion W1 having a specified cross angle θ1 (an acute angle in the present embodiment).

The above-described cowl panel 12 and dash upper panel 9 which are joined to each other via a joint point of the attachment pieces 9c, 13 form a frame OF which has an open section 18 opening forward in the vehicle. That is, the frame OF includes its upper face portion which is comprised of the cowl panel 12 and its lower face portion which is comprised of the dash upper panel 9, and these upper and lower face portions are joined to each other via a single point at their rear-side portions (their front-side portions are not joined), so that the frame OF has the open section opening forward and extends in the vehicle width direction. As described above, the vehicle of the present embodiment is a so-called open cowl structure type of vehicle in which a structural member supporting the windshield 11 is comprised of a frame member having an open section, not a closed section.

The extension portion 16 of the cowl panel 12 (the upper face of the frame OF) has a windshield support portion 16a which supports a lower side portion of the windshield 11 at its rear-side portion. Specifically, an adhesive 17 is applied on the upper face of the windshield support portion 16a, and the lower side portion of the windshield 11 is joined to the windshield support portion 16a via the adhesive 17.

A specified portion of the extension portion 16 which is located in front of the windshield support portion 16a bends toward a direction away from the windshield 11 (i.e., downward), and a specified gap is formed between this specified portion and the windshield 11.

Inside the frame OF (in the opening section 18) is provided a support member 20 which extends vertically to connect the upper face portion and the lower face portion of the frame OF (the cowl panel 12 and the dash upper panel 9) as shown in FIGS. 3 and 4.

This support member 20 supports two points of the front end portion (the extension portion 16) of the cowl panel 12 and a specified portion (the horizontal portion 15) which is located rearward away from this front end portion to restrain vibrations inputted to the cowl panel 12.

Further, a space X (deformation-allowance area) which allows the cowl panel 12 to deform downward when the windshield receives the impact load from above in the vehicle frontal collision is formed between the above-described two support portions of the support member 20.

Figure 6:
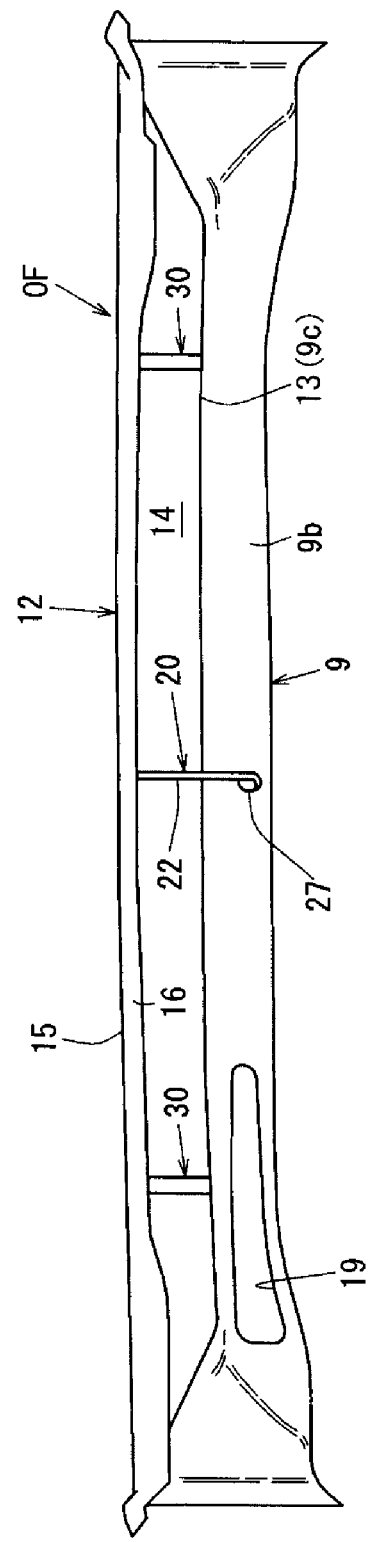
FIG. 6 is an elevational view of a main part of FIG. 3.

FIG. 6 is an elevational view of the frame OF, which viewed from a vehicle front. The support member 20 is arranged at a middle position (at a central position in the present embodiment), in the vehicle width direction, of the frame OF which is comprised of the cowl panel 12 and the dash upper panel 9, and a pair of assistant member 30 is provided at both side portions of the frame OF.

As shown in the elevational view of FIG. 6, the support member 20 is formed to extend straightly in the vertical direction in the elevational view. Thereby, the vertical vibration inputted from the windshield 11 is efficiently absorbed by the support member 20.

Figure 7A:
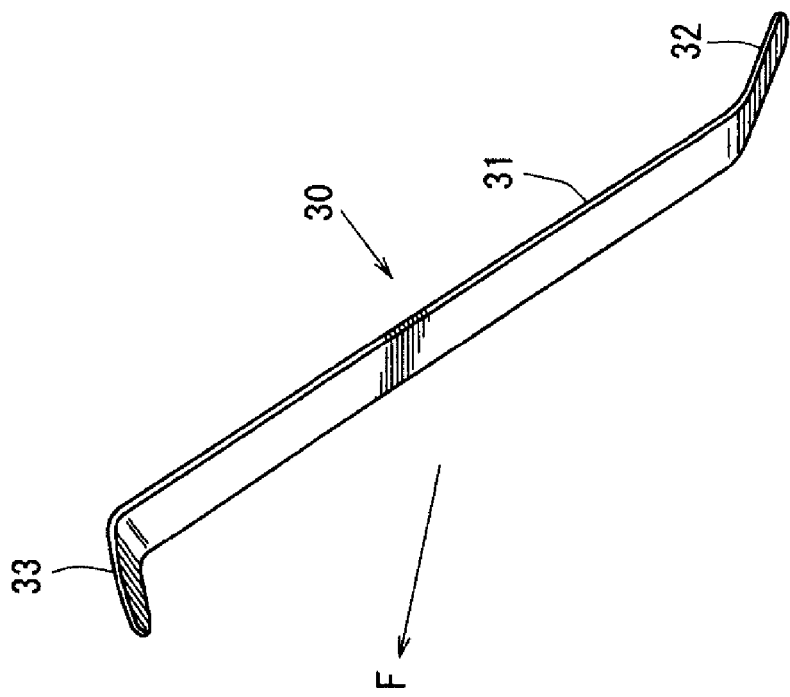
FIG. 7A is a perspective view of a support member.

FIG. 7A is a perspective view of the support member 20. As shown in FIGS. 7A, 3, 4 and 6, the support member 20 comprises a rear frame portion 21 which extends vertically, a front frame portion 22 which extends vertically in front of the rear frame portion 21, a connection portion 23 which longitudinally connects upper portions of the frame portions 21, 22, a flange-shaped rear support portion 24 which is formed integrally with an upper end portion of the rear frame portion 21 to bend, and a flange-shaped support portion 25 which is formed integrally with an upper end portion of the front frame portion 22 to bend. This support member 20 is attached inside the frame OF such that its plate-thickness direction matches the vehicle width direction (specifically, a direction of a plate thickness of a main portion of the support member 20 except the front and rear support portions 25, 24 and a flange portion 27, which will be described below).

The rear frame portion 21 and the front frame portion 22 are formed in a V shape in a side view, and lower portions of the frame portions 21, 22 are formed integrally as a common portion 26 (see FIGS. 4 and 7). The flange portion 27 is integrally formed with a lower end portion of the common portion 26 to bend. In the present embodiment, respective bending directions of the front and rear support portions 25, 24 and the flange portion 27 are set to be the same.

Between the front and rear frame portions 22, 21 is a triangular space Y which is enclosed by the rear frame portion 21, the front frame portion 23, and the common portion 26. This space Y is positioned below the space X formed between the front and rear support portions 25, 24 via the connection portion 23.

As shown in FIG. 4, the rear frame portion 21 of the support member 20 is attached to the horizontal portion 15 of the cowl panel 12 via the rear support portion 24. That is, the rear support portion 24 is joined to a lower face of the horizontal portion 15 of the cowl panel 12 by joint means, such as spot welding, and the rear frame portion 21 is formed to extend from this connection portion (the rear support portion 24) downward toward the dash upper panel 9. The rear support portion 24 is positioned in back of the windshield support portion 16a (an adhesive point by the adhesive 17) supporting the windshield 11 and also in back of the bending portion W1.

Further, as shown in the same figure, the front frame portion 22 of the support member 20 is attached to the extending portion 16 of the cowl panel 12 via the front support portion 25. That is, the front support portion 25 is joined to a lower face of the extension portion 16 of the cowl panel 12 by joint means, such as spot welding, and the front frame portion 22 is formed to extend from this connection portion (the front support portion 25) downward toward the dash upper panel 9. The front support portion 25 is positioned in front of the windshield support portion 16a (the adhesive point by the adhesive 17) supporting the windshield 11 and also in front of the bending portion W1.

The flange portion 27 on the lower side of the support member 20 is joined to an upper face of the body portion 9b of the dash upper panel 9 by the spot welding or the like, and the lower end portion (the common portion 26) of the front and rear frame portions 22, 21 is attached to the dash upper panel 9 via the flange portion 27.

Herein, the horizontal portion 15 to which the rear support portion 24 of the support member 20 is attached corresponds to "a first wall portion" of the present invention, the extension portion 16 to which the front support portion 25 is attached corresponds to "a second wall portion" of the present invention, and the rise portion 14 extending downward from the rear end portion of the horizontal portion 15 (the first wall portion) corresponds to "a third wall portion" of the present invention.

An arrow α in FIG. 4 shows the direction of the film vibration of the windshield 11 caused by a force (such as a traveling-air force) acting on the windshield 11 during the vehicle traveling. As shown in FIG. 4, the front frame portion 22 is arranged to extend in parallel to the input direction (the arrow a) of the load inputted to the cowl panel 12 in accordance with the film vibration of the windshield 11. That is, the front frame portion 22 extends obliquely rearward and downward from the cowl panel 12 to the dash upper panel 9, and the extension direction of the front frame portion 22 is set to match the input direction of the load caused by the film vibration.

The rear frame portion 21 is arranged to extend substantially in parallel to the rise portion 14 of the cowl panel 12 positioned in back of that, that is, in a direction more closer to the perpendicular angle than the above-described front frame portion 22. The rear frame portion 21 is provided in front of and away from the rise portion 14 of the cowl panel 12, so that the rear frame portion 21 and the rise portion 14 form a space Z therebetween. The longitudinal width of the space Z, that is, the gap (distance) between the rear frame portion 21 and the rise portion 14 is set to be almost constant over the vertical direction.

Figure 7B:
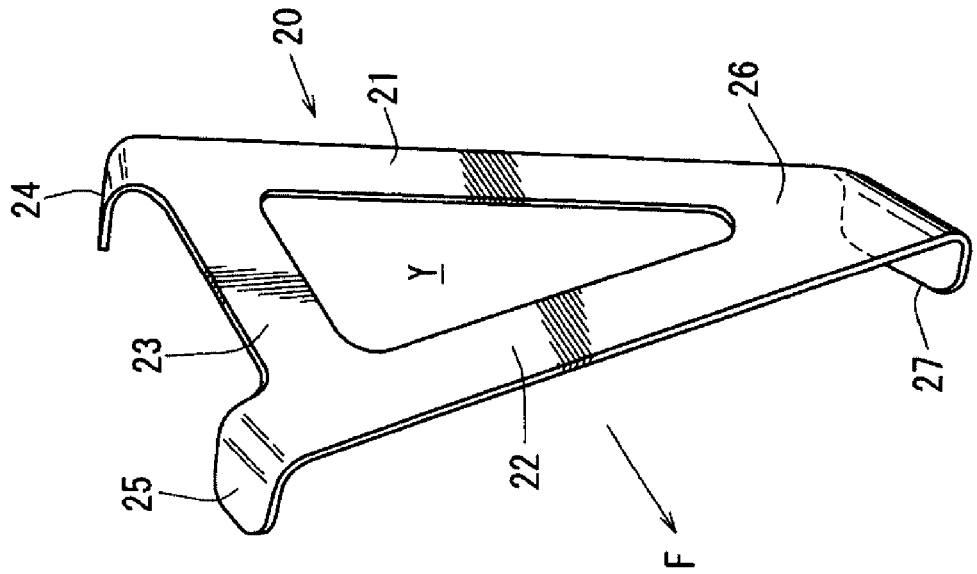
FIG. 7B is a perspective view of an assistant member.

FIG. 7B shows a perspective view of the assistant member 30, and this assistant member 30 comprises a body portion 31, a lower-end flange portion 32 which is formed integrally with a lower end of the body portion 31 to bend, and an upper-end flange portion 33 which is formed integrally with an upper end of the body portion 31 to bend.

The assistant member 30, as shown in FIG. 5 in particular, is fixed between the cowl panel 12 and the dash upper panel 9 such that the lower-end flange portion 32 is attached to the joint point (between the attachment pieces 9c, 13) between the cowl panel 12 and the dash upper panel 9, and the upper-end flange portion 33 is attached to the extension portion 16 of the cowl panel 12. Specifically, the upper-end flange portion 33 of the assistant member 30 is joined to the attachment pieces 9c, 13 by the spot welding or the like in a state in which it is located between these attachment pieces 9c, 13. Further, the lower-end flange portion 32 of the assistant member 30 is joined, by the spot wielding or the like, to a specified portion of the extension portion 16 of the cowl panel 12 which is positioned in front of the windshield support portion 16a (the point where the windshield 11 is attached via the adhesive 17).

As shown in FIGS. 3 and 6, the right-side assistant member 30 (which is illustrated on the left in FIGS. 3 and 6) is attached at a position such that it overlaps with the inlet port of conditioning air 19 in the vehicle width direction. However, since the assistant member 30 is attached with the above-described structure, the right-side assistant member 30 never closes the inlet port of conditioning air 19.

Next, the operation of the present embodiment will be described referring to FIGS. 1 through 7.

First, the operation in the non-collision state (normal state) in which no impact load is inputted to the windshield from above will be described. As shown in FIG. 4, since the cowl panel 12 (the upper face portion of the frame OF) is supported at two points (away from each other longitudinally) of the support portions (the front and rear support portions 25, 24) of the V-shaped support member 20 according to the present embodiment, the vibration load inputted to the cowl panel 12 from the windshield 11 (the vibration caused by the film vibration of the windshield during the vehicle traveling) can be efficiently absorbed by the support member 20. Thereby, the vibrations of the windshield 11 and the cowl panel 12 are restrained sufficiently, so that noises in the vehicle compartment 7 caused by the film vibration of the windshield 11 during the vehicle traveling can be restrained effectively.

Further, since the support member 20 is formed to extend straightly in the vertical direction in the elevational view as shown in the elevational view of FIG. 6, the support member 20 provides a properly strong structure against the vertical vibration, so that the restraint of the vibrations of the cowl panel 12 and the windshield 11 can be effected achieved.

Also, since the upper portions of the rear frame portion 21 and the front frame portion 22 of the support member 20 are connected longitudinally via the connection portion 23 as shown in FIG. 4, the vibrations of the windshield 11 and the like can be reduced more effectively by the support member 20.

Moreover, since the front frame portion 22 of the support member 20 is provided to extend in parallel to the input direction (the arrow α) of the vibration load inputted to the cowl panel 12 from the windshield 11 as shown in FIG. 4, the vibration load can be absorbed efficiently by the front frame portion 22, so that the vibrations of the windshield 11 and the like can be reduced much more effectively by the support member 20.

In addition, the support member 20 is arranged at the middle position, in the vehicle width direction, of the frame OF comprised of the cowl panel 12 and the dash upper panel 9, and the pair of assistant members 30 are provided at the both side portions of the frame OF on the outside, in the vehicle width direction, of the support member 20 as shown in FIGS. 3, 6 and others. Accordingly, the relatively large vibration load at the middle position, in the vehicle width direction, of the windshield 11 is supported by the support member 20, and the relatively small vibration load at the side positions, in the vehicle width direction, of the windshield 11 is supported by the assistant members 30. Thereby, the vibration of the windshield 11 can be reduced efficiently.

Since the spaces X, Y and Z are formed at and around the support member 20 as shown in FIG. 4, the air passage for air conditioning can be ensured by these spaces X, Y and Z. Accordingly, even if the support member 20 is provided, when the air flows into the inside (the open section 18) of the frame OF from an opening of a cowl grill, not illustrated, the air flow toward the inlet port for conditioning air 19 is not obstructed.

Next, the operation in the case of the vehicle frontal collision when a pedestrian is pushed up onto the windshield 11 and thereby the impact load is inputted to the windshield 11 from above will be descried. According to the present embodiment, as shown in FIG. 4, since the frame OF (the cowl panel 12 and the dash upper panel 9) supporting the front side portion of the windshield 11 has the open section 18 opening forward in the vehicle, the frame OF (in particular, the front end portion of the cowl panel 12) easily deforms when the above-described load is inputted, so that the pedestrian protection function can be ensured properly.

Further, as shown in FIG. 4, there exist, as the spaces formed at and around the support member 20, the space X formed between the front and rear support portions 25, 24 supporting the cowl panel 12, the space Y formed between the front and rear frame portions 22, 21, and the space Z formed between the rear frame portion 21 and the rise portion 14 of the cowl panel 12. Accordingly, the air passage for conditioning air flowing inside the frame OF can be ensured properly, and the deformation of the support member 20 and the frame OF in the vehicle frontal collision can be promoted.

Specifically, the downward deformation of cowl panel 12 can be easier due to existence of the space X, and the deformation of the support member 20 itself can be easier due to existence of the space Y. Also, the deformations of the cowl panel 12 and the support member 20 can be easier due to existence of the space Z. Thereby, when the downward impact load is inputted from the windshield 11, the deformations of the support member 20 and the cowl panel 12 as well as the air passage for air conditioning can be ensured, and the pedestrian protection function can be improved.

Figure 8:
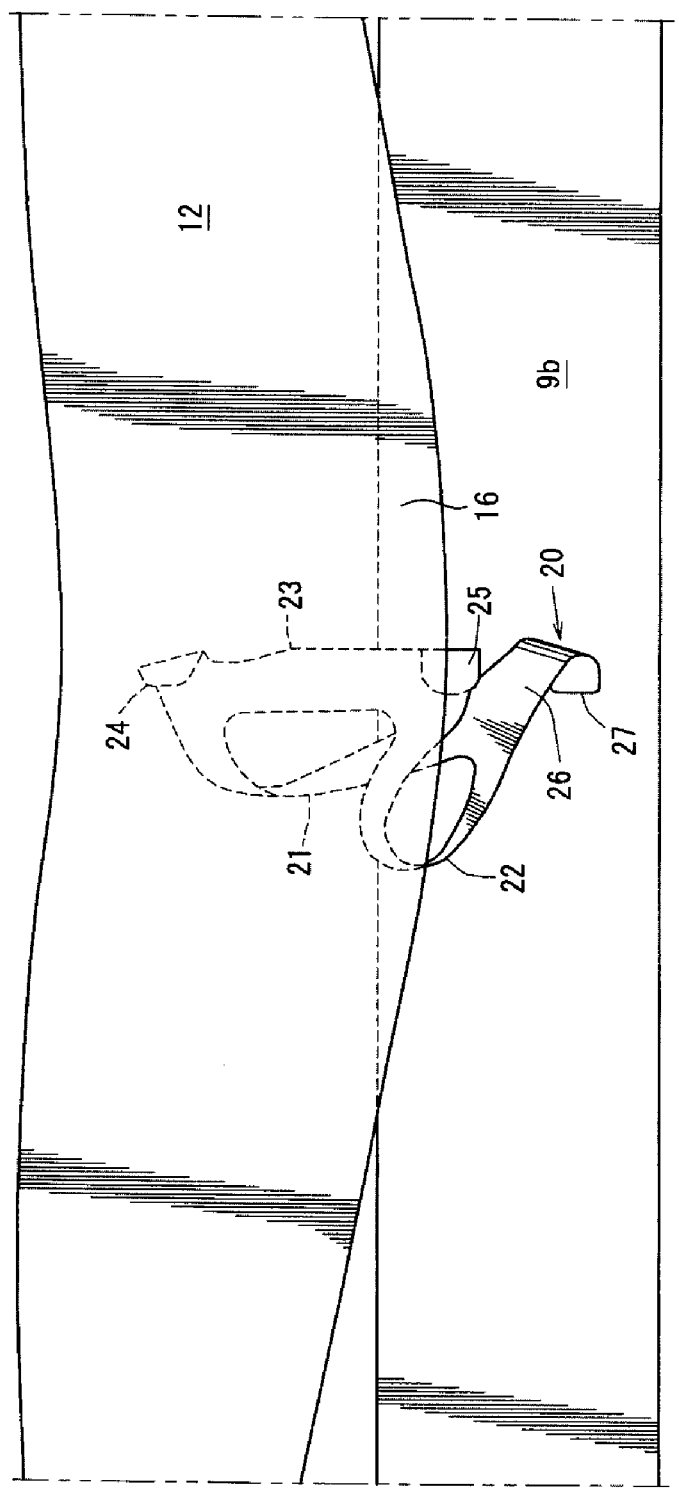
FIG. 8 is an elevational view showing a deformation state of the support member and a cowl panel.

FIG. 8 is an elevational view showing the deformation state of the cowl panel 12 and the support member 20. As the downward impact load is inputted in the vehicle frontal collision, the cowl panel 12 and the support member 20 change their states from their pre-deformation state shown in FIG. 6 to their post-deformation state shown in FIG. 8. That is, when the downward impact load is inputted from the windshield 11, the front end, as a free end, of the extension portion 16 of the cowl panel 12 deforms downward. Accordingly, the front and rear frame portions 22, 21 of the support member 20 bend toward a one side in the vehicle width direction (the vertical length of the support member becomes shorter).

Since the connection portion of the cowl panel 12 and the front and rear support portions 25, 24, and the connection portion of the dash upper panel 9 and the flange portion 27 are stronger than the other part, the cowl panel 12 bends as shown in FIG. 8 when the impact load is inputted.

Further, the downward deformation of the extension portion 16 of the cowl panel 12 is further promoted by existence of the bending portion W1. That is, since the horizontal portion 15 and the extension portion 16 of the cowl panel 12 are connected to each other via the bending portion W1 having the specified cross angle θ1 (not being round), the easier deformation of the extension portion 16 of the cowl panel 12 can be properly caused by this bending portion W1.

Moreover, the windshield support portion 16a directly supporting the windshield 11 projects upward beyond the front portion (the front portion of the extension portion 16), and the front portion of the extension portion 16 and the windshield 11 are located away from each other. Thereby, when the impact load is inputted to the windshield support portion 16a from the windshield 11 in the vehicle frontal collision, only the windshield support portion 16a deforms downward easily first. Accordingly, the downward deformation of the windshield support portion 16a, that is, the downward deformation of the cowl panel 12, is promoted effectively.

Figure 9:
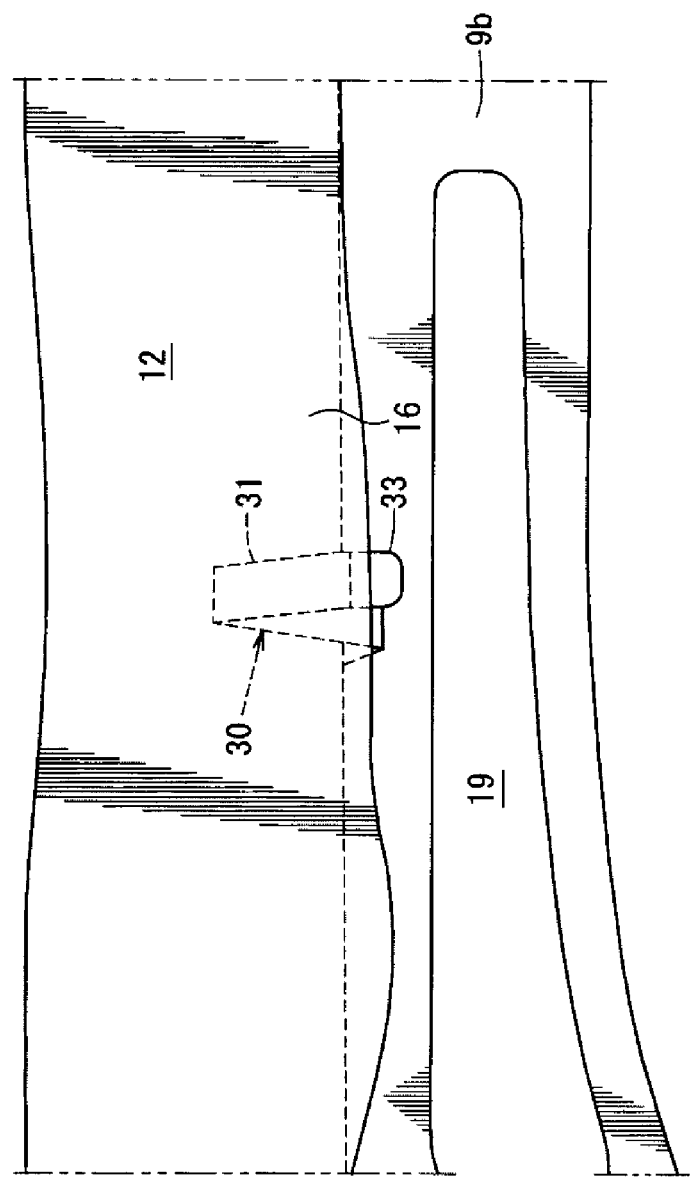
FIG. 9 is an elevational view showing a deformation state of the assistant member and the cowl panel.
Figure 10:
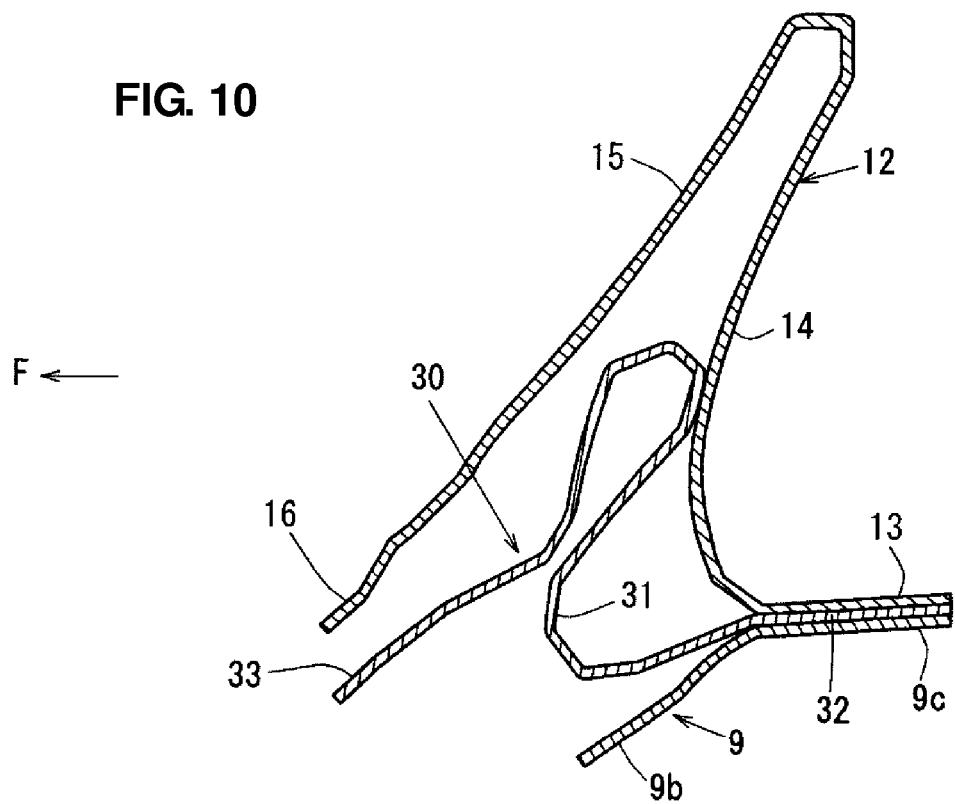
FIG. 10 is a side view showing the deformation state of the assistant member and the cowl panel.

FIG. 9 is an elevational view showing the deformation state of the cowl panel 12 and the assistant member 30, and FIG. 10 is a side view of that. As shown in these figures, as the downward impact load is inputted from the windshield 11, the cowl panel 12 and the assistant member 30 change their states from the pre-deformation states shown in FIGS. 5 and 6 to the post-deformation states shown in FIGS. 9 and 10. That is, the extension portion 16 of the cowl panel 12 deforms downward, and accordingly the assistant member 30 deforms such that the body portion 31 bends.

Hereafter, the distinctive constitutions of the first embodiment described with FIGS. 1 through 10 and their advantages will be described.

The support structure of a windshield of the present embodiment comprises the frame OF having the open section 18 opening forward in the vehicle and extending in the vehicle width direction along the lower side portion of the windshield 11, and the support member 20 provided inside the frame OF and connecting the upper face portion and the lower face portion (the cowl panel 12 and the dash upper panel 9) of the frame OF. The frame OF has the windshield support portion 16a supporting the lower side portion of the windshield 11 at part of the upper face portion thereof (the cowl panel 12), and the support member 20 includes the rear support portion 24 attached to the cowl panel 12 (the upper face portion of the frame) and the front support portion 25 attached to the cowl panel 12 at the specified location positioned in front of the rear support portion 24. Further, the windshield support portion 16a is positioned between the front and rear support portions 25, 24 in the vehicle longitudinal direction.

According to the support structure of the present embodiment, since the windshield support portion 16a supporting the windshield 11 is provided at the upper face portion (the cowl panel 12) of the frame OF having the open section 18 opening forward, the cowl panel 12 deforms easily in the vehicle frontal collision (when the pedestrian is pushed up onto the windshield 11), so that the pedestrian protection function can be ensued properly. Herein, since the support member 20 includes the front and rear support portions 25, 24, as the portions supporting the cowl panel 12, which are positioned away from each other in the vehicle longitudinal direction, the specified space X is formed between these support portions 25, 24, so that the downward deformation of the cowl panel 12 can be promoted properly. Further, since the cowl panel 12 is supported at the plural positions (the front and rear support portions 25, 24) as described above, in the non-collision state (the normal state) in which no impact load is inputted to the windshield 11, vibrations of the windshield 11 and the cowl panel 12 are reduced, so that it can be properly restrained that noises are generated in the vehicle compartment. Thus, both the NV function and the pedestrian protection function can be properly ensured.

Further, according to the present embodiment, the support member 20 extends straightly in the vertical direction in the elevational view as shown in FIG. 6 and others. Thereby, the support member 20 can provide the properly strong structure against the vertical vibrations occurring in the vertical direction and effectively restrain the vibration of the windshield 11 in the non-collision state (in the normal state).

Also, according to the present embodiment, the cowl panel 12 (the upper face portion of the frame) includes the horizontal portion 15 (the first wall portion) to which the rear support portion 24 of the support member 20 is attached and the extension portion 16 (the second wall portion) which extends forward from the horizontal portion 15 and to which the front support portion 25 of the support member 20 is attached, and the bending portion W1 having the specified cross angle θ1 is formed at the connection portion of the horizontal portion 15 and the extension portion 16. This bending portion W1 is positioned between the front and rear support portions 25, 24 in the vehicle longitudinal direction. Thereby, since the extension portion 16 of the cowl panel 12 easily bends downward at the bending portion W1 in the vehicle frontal collision, the pedestrian protection function can be improved further.

Moreover, according to the present embodiment, the windshield support portion 16a is formed by part of the rear side portion of the extension portion 16 (the second wall portion), the front support portion 25 is attached to the specified portion of the extension portion 16 which is positioned in front of the windshield support portion 16a. The specified portion of the extension portion 16 to which the front support portion 25 is attached is formed at the specified location below the windshield support portion 16a. Thereby, the downward deformation of the windshield support portion 16a is not obstructed by the front portion of the extension portion 16 in the vehicle frontal collision, so that the deformation of the cowl panel 12 including the windshield support portion 16a can be promoted more effectively.

Further, according to the present embodiment, the support member 20 has the front frame portion 22 extending obliquely rearward and downward from the cowl panel 12 to the dash upper panel 9 (from the upper face portion to the lower face portion of the frame), and the extension direction of the front frame portion 22 matches the input direction (the arrow a) of the load caused by the film vibration of the windshield 11 (see FIG. 4). Thereby, the vibration load inputted from the windshield 11 in the non-collision state (normal state) can be efficiently absorbed by the front frame portion 22 arranged in parallel to the input direction of this load, so that the vibration reduction can be achieved more effectively.

Also, according to the present embodiment, the cowl panel 12 further includes the rise portion 14 (the third wall portion) which extends downward from the rear end portion of the horizontal portion 15 and is formed at the specified location in back of the rear side portion of the rear frame portion 21 (the rear side portion of the support member) of the support member 20, in addition to the horizontal portion 15 (the first wall portion) and the extension portion 16 (the second wall portion). Thereby, since the space Z is formed between the rise portion 14 of the cowl panel 12 and the rear frame portion 21 of the support member 20, the deformations of the cowl panel 12 and the support member 20 in the vehicle frontal collision can be promoted. Further, the passage of air for air conditioning can be provided by this space Z.

Moreover, according to the present embodiment, the front and rear support portions 25, 24 of the support member 20 are respectively attached to front and rear points of the cowl panel 12 which are positioned above the connection portion of the cowl panel 12 and the dash upper panel 9 (the connection portion of the attachment pieces 9c, 13), and the lower end portion (the flange portion 27) of the support member 20 is attached to the specified portion of the dash upper panel 9 which is positioned below the connection portion of the cowl panel 12 and the dash upper panel 9. Thereby, since the vertical rigidity of the frame OF is ensured sufficiently, the vibration of the windshield 11 and the like can be reduced more effectively in the non-collision state (normal state).

Further, according to the present embodiment, the support member 20 is provided at the middle position (preferably, at the center position), in the vehicle width direction, of the frame OF comprised of the cowl panel 12 and the dash upper panel 9, and a pair of assistant members 30 is provided at the both side portions of the frame OF which are positioned on the outside, in the vehicle width direction, of the support member 20. Each of the assistant members 30 includes the lower end portion (the lower flange portion 32) attached to the connection portion of the cowl panel 12 and the dash upper panel 9 and the upper end portion (the upper end flange portion 33) attached to the specified portion of the cowl panel 12 which is positioned above the connection portion of the cowl panel 12 and the dash upper panel 9 (see FIGS. 5 and 6). Thereby, in case the vibration load at the middle position where the relatively large vibration of the windshield 11 occurs is supported, whereas the vibration load at the side position where the relatively small vibration of the windshield 11 occurs, the vibration of the windshield 11 can be reduced efficiently in the non-collision state (normal state).

Also, according to the present embodiment, the support member 20 is comprised of a plate member which is arranged such that the direction of plate thickness thereof is parallel to the vehicle width direction, and the assistant member 30 is comprised of another plate member which is arranged such that the direction of plate thickness thereof is perpendicular to the vehicle width direction. Thereby, in case the plural plate members with different directions are arranged at the plural positions in the vehicle width direction as the support member 20 and the assistant member 30, the vibration of the windshield 11 can be reduced more effectively.

Figure 11:
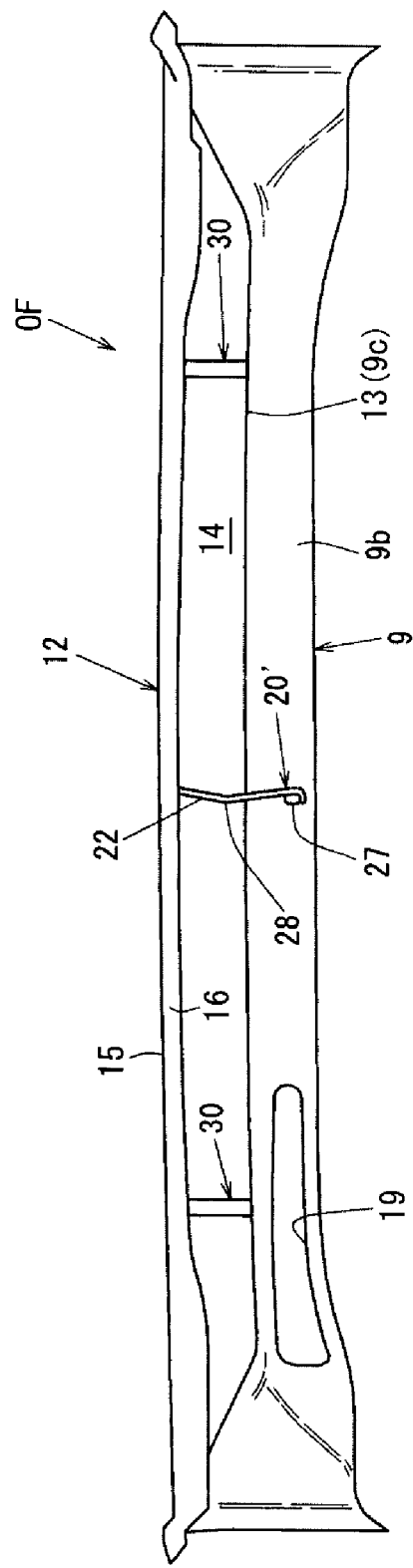
FIG. 11 is an elevational view showing a second embodiment of the support structure of the windshield.

FIG. 11 shows a second embodiment of the support structure of a windshield. While the support member 20 provided at the middle position of the frame OF is formed to extend straightly in the vertical direction in the elevational view in the above-described first embodiment (FIG. 6), a support member 20' of the second embodiment shown in FIG. 11 has a bending portion 28 at its middle position in the vertical direction, that is, at a portion between the attachment portions (the front and rear support portions 25, 24) to the cowl panel 12 and the attachment portion (the flange portion 27) to the dash upper panel 9.

Thus, in case the bending portion 28 is formed at the middle position, in the vertical direction, of the support member 20' so that the support member 20' is formed in a bending shape in the elevational view, the support member 20' easily deforms (bends) in the vehicle width direction at the bending portion 28 in the vehicle frontal collision when the impact load is inputted from above. Thereby, the deformation of the cowl panel 12 is further prompted, so that the pedestrian protection function can be further improved.

The other constitution and the operation and advantages of the second embodiment shown in FIG. 11 are the same as those of the first embodiment (FIGS. 1 through 10). In FIG. 11, the same components as the first embodiment are denoted by the same reference characters, and their specific descriptions are omitted. Herein, the bending direction of the support member 20' at the bending portion 28 may be configured to be opposite to that described above.

Figure 12:
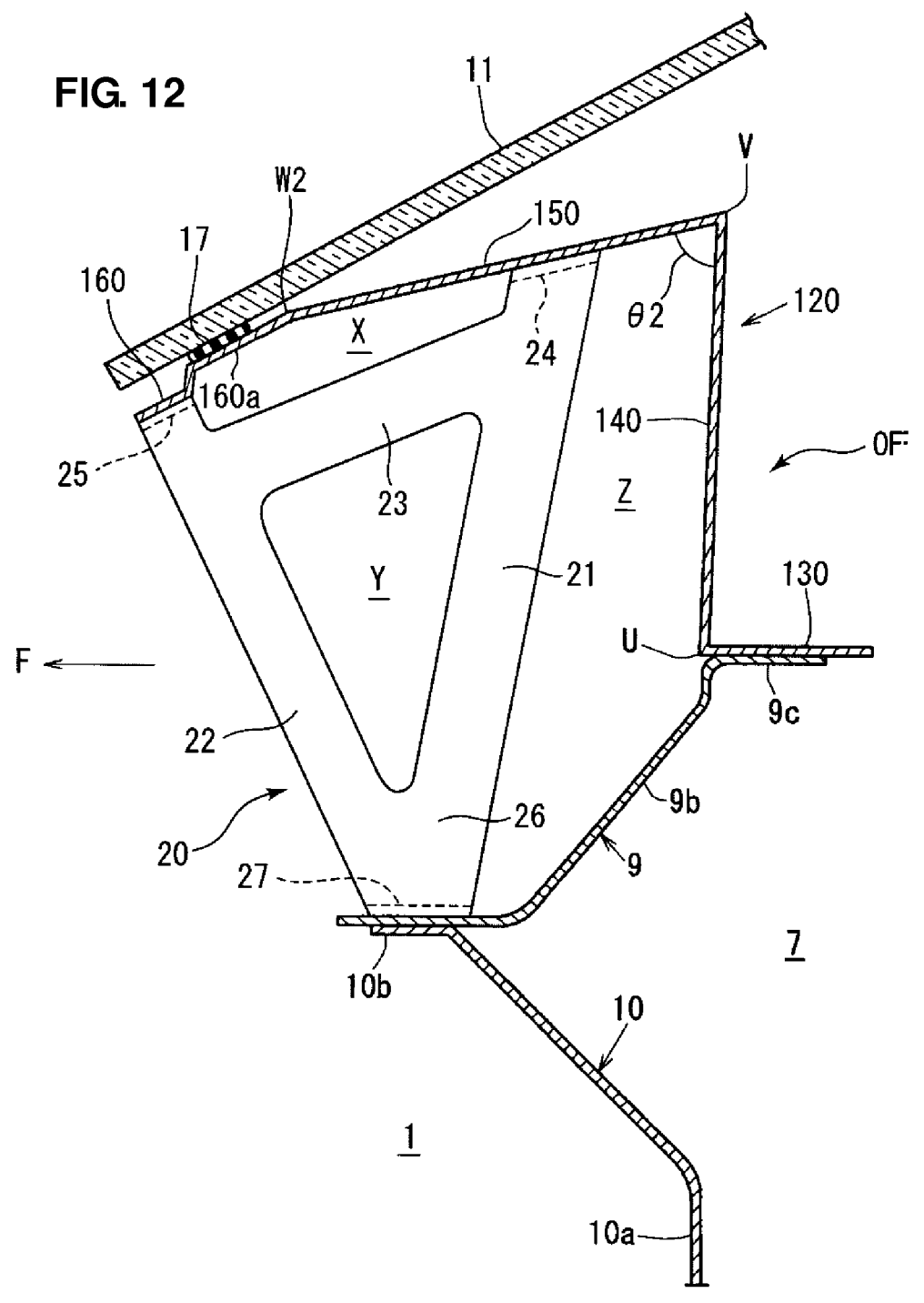

FIG. 12 shows a third embodiment of the support structure of the windshield. A cowl panel 120 (the upper face portion of the frame OF) of the third embodiment comprises a slant portion 150 (the first wall portion) to which the rear support portion 24 of the support member 20 is attached, an extension portion 160 (the second wall portion) which extends forward from a front end portion of the slant portion 150 and to which the front support portion 25 of the support member 20 is attached, a rise portion 140 (the third wall portion) which extends downward from a rear end portion of the slant portion 150, and an attachment piece 130 which extends rearward from a lower end portion of the rise portion 140.

A rear portion of the extension portion 160 of the cowl panel 120 forms a windshield support portion 160*a* to which the windshield 11 is attached via the adhesive 17. Further, a front portion of the extension portion 160 which is positioned in front of the windshield support portion 160*a* bends downward and a specified gap is formed between this front portion and the windshield 11.

Bending portions (not being round) W2, V and U are formed respectively at a connection portion of the slant portion 150 and the extension portion 160, a connection portion of the slant portion 150 and the rise portion 140, and a connection portion of the rise portion 140 and the attachment portion 130. The respective length of the slant portion 150 and the rise portion 140 in a sectional view, that is, the distance between the bending portion W2 and the bending portion V and the distance between the bending portion V and the bending portion U, are set to be substantially the same.

Only the bending portion V has an acute cross angle $\theta 2$. Further, the positional relationships among the bending portions U, V and W2 are set such that the bending portion V is positioned at an uppermost location, the bending portion U is positioned at a lowermost location, and the bending portion W2 is positioned at a foremost location.

Since the cowl panel 120 is formed in the above-described shape, when the downward impact load is inputted to windshield 11 in the vehicle frontal collision, the cowl panel 120 can be deformed properly efficiently. That is, the above-described almost equal setting of the distance between the bending portions W2 and V (the length of the slant portion 150) and the distance between the bending portions V and U (the length of the rise portion 140) can make the deformation of the cowl panel 120 around the bending portion V properly efficient, restraining any improper deviation and distortion.

More specifically, the cowl panel 120 is formed in a three dimensional shape such that its central portion projects foremost (its both sides retreat) from the designing aspect, so that in case the distance between the bending portions W2 and V is considerably different from the distance between the bending portions V and U, some deviation and distortion may be generated improperly in the deformation of the cowl panel 120. However, if the distance between the bending portions W2 and V is set almost equal to the distance between the bending portions V and U as shown in FIG. 12, this improper deviation and distortion is restrained so that the cowl panel 120 can be deformed efficiently.

Also, since the bending portion V which becomes the center of the deformation in the vehicle frontal collision, that is, is formed at the connection portion of the slant portion 150 (the first wall portion) and the rise portion 140 (the third wall portion), has the acute cross angle $\theta 2$, the cowl panel 120 bends easily so that the pedestrian protection function can be improved.

In the third embodiment shown in FIG. 12, the arrangement direction of the support member 20 is slightly different from the case of the first embodiment (FIG. 4) corresponding to the above-described shape of the cowl panel 120. That is, the rear frame portion 21 of the third embodiment is arranged to slant slightly rearward such that a specified constant gap is formed vertically between the rear frame portion 21 of the support member 20 and the rise portion 140 (the third wall portion) of the cowl panel 120. Specifically, the rear frame portion 21 slightly slants forward and downward from the attachment portion (the rear support portion 24) to the cowl panel 120.

Thereby, even if the rise portion 140 of the cowl panel 120 is configured to be located almost upright as shown in FIG. 12, the sufficient wide space Z is formed between the rear frame portion 21 and the rise portion 140. Accordingly, the deformations of the cowl panel 120 and the support member 20 can be promoted effectively in the vehicle frontal collision.

Figure 13:
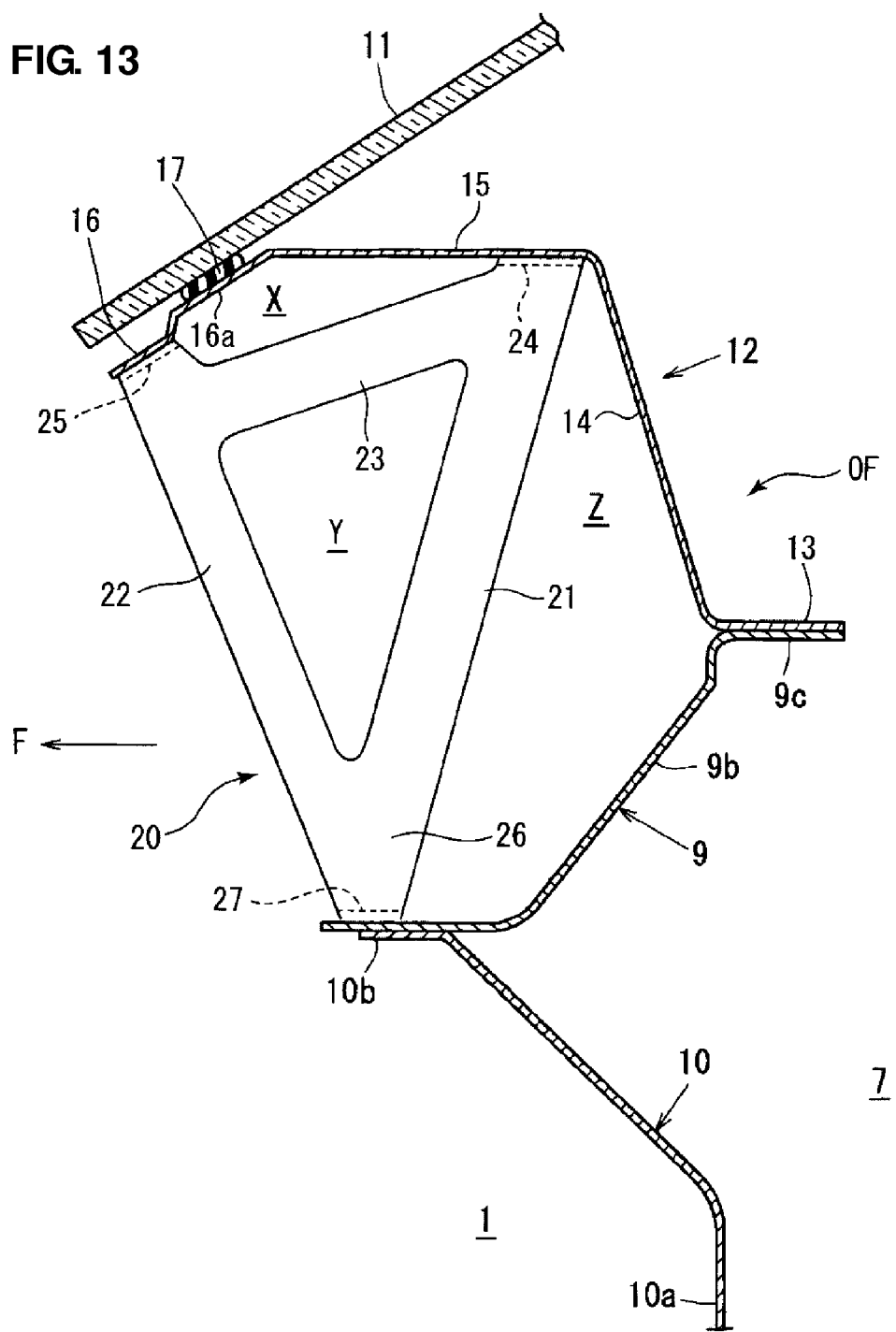
FIG. 13 is a side view showing a fourth embodiment of the support structure of the windshield.
Figure 14:
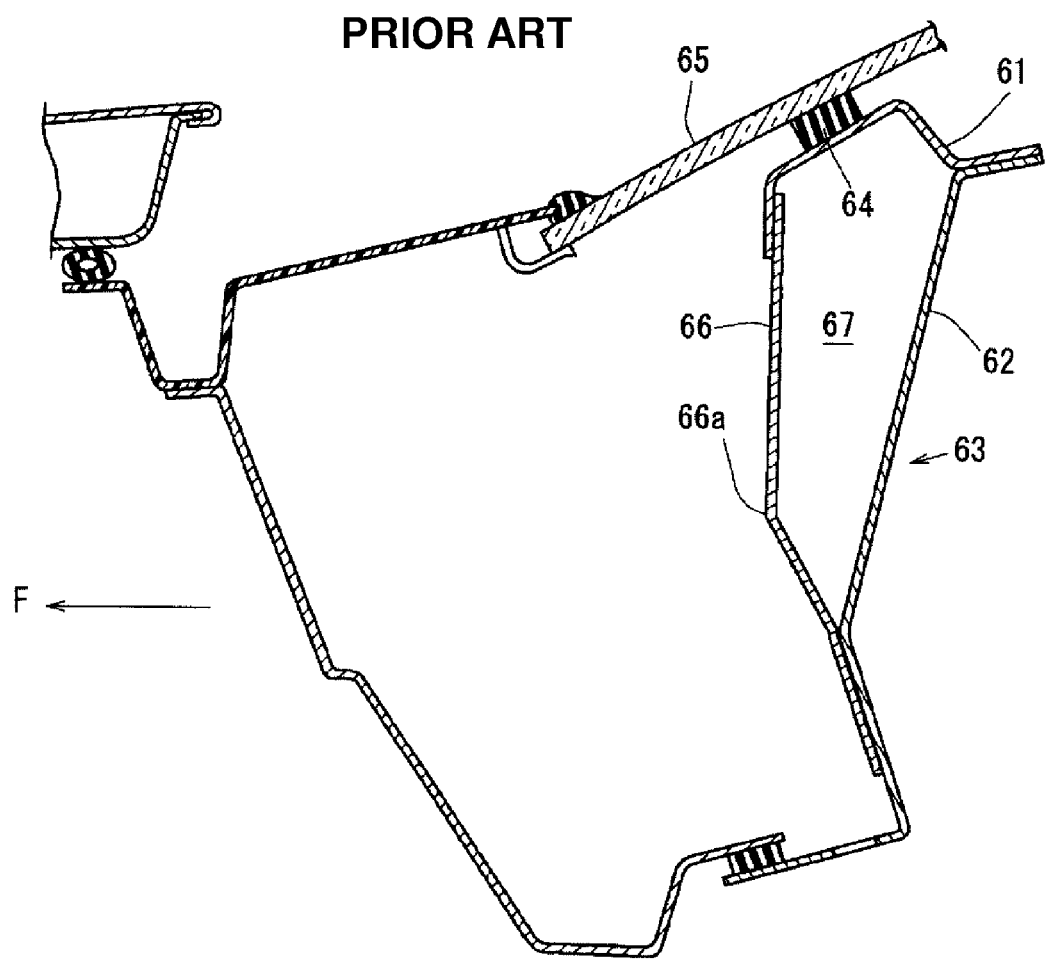
FIG. 14 is a side view showing a conventional support structure of the windshield.
Figure 15:
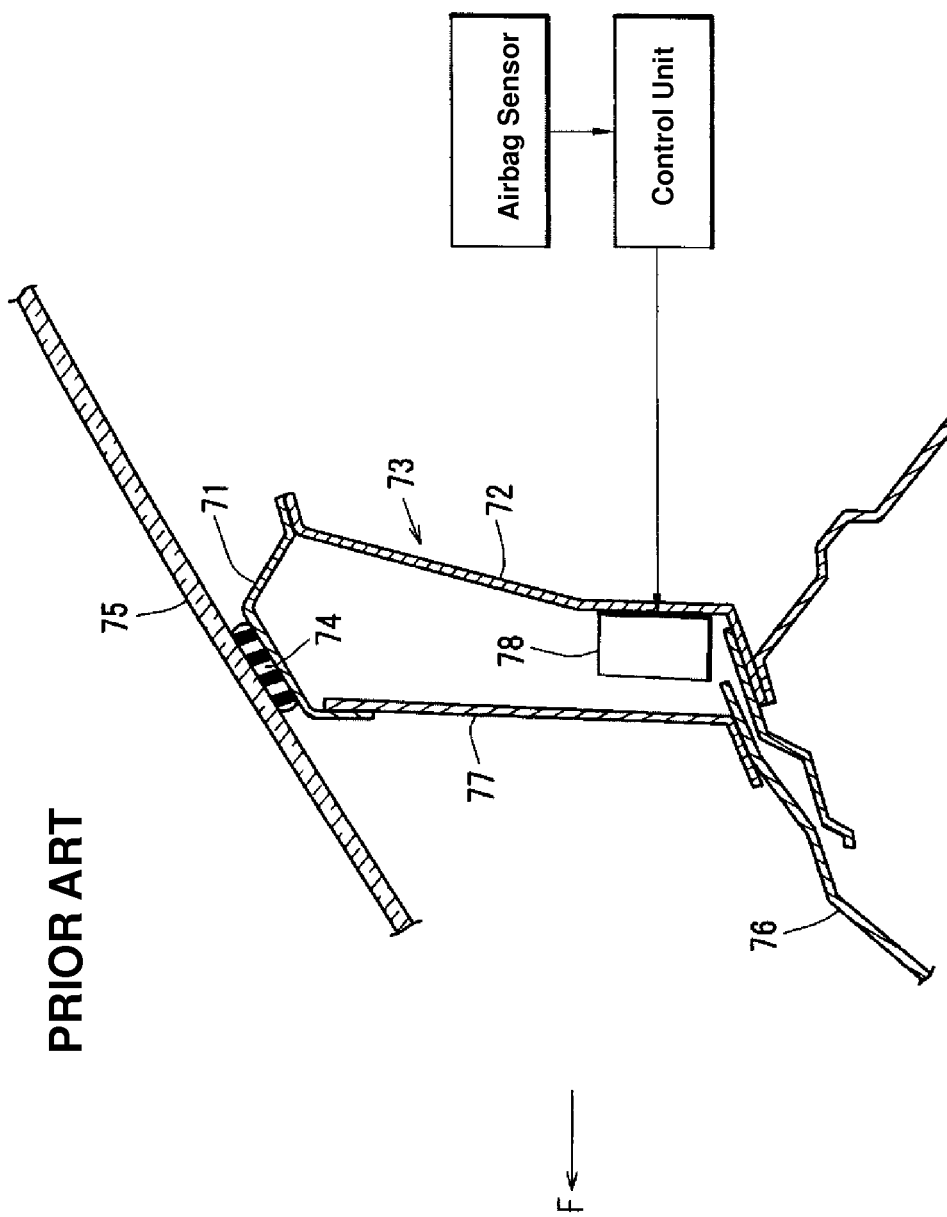
FIG. 15 is a side view showing another example of the conventional support structure of the windshield.
Figure 16:
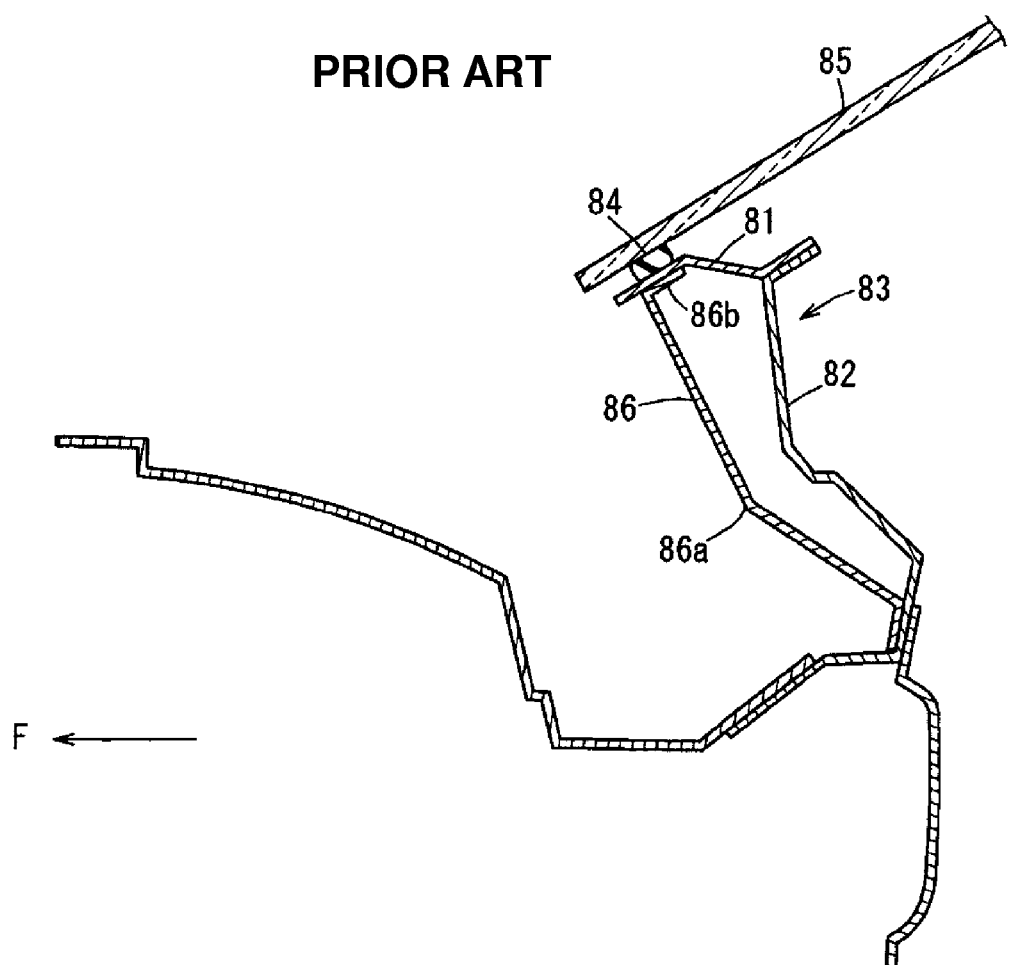
FIG. 16 is a side view showing further another example of the conventional support structure of the windshield.

FIG. 13 shows a fourth embodiment of the support structure of a windshield. As shown in this figure, the cowl panel 12 and the dash panel 9 (the frame OF) are formed in the same shapes as those of the first embodiment, but the support member 20 can be arranged in the position shown in FIG. 13. That is, the support member 20 of the fourth embodiment is configured such that the front frame portion 22 extends substantially vertically and the rear frame portion 21 slants rearward. According to this structure, the space Z formed between the rear frame portion 21 and the rise portion 14 of the cowl panel 12 can be wider than that of the first embodiment shown in FIG. 4. Thereby, the cowl panel 12 and the support member 20 can be more easily deformed in the vehicle frontal collision.

The present invention should not be limited to the above-described embodiments, and any other modifications and improvements may be applied within the scope of a sprit of the present invention.

For example, while the dash upper panel 9 and the dash lower panel 10 are made of the separate panel members, these may be formed integrally so that the vehicle compartment 7 and the engine room 1 are partitioned from each other by a sheet of dash panel. In this case, an upper-side portion of the dash panel corresponds to the dash upper panel.

What is claimed is:

1. A support structure of a windshield, comprising:
a frame having a cross section which opens forward in a vehicle longitudinal direction and extending in a vehicle width direction along a lower side portion of the windshield; and
a support member provided inside said forward-opening cross section of the frame and attached to an inside face of an upper face portion of the frame via front and rear upper-support portions thereof and attached to an inside face of a lower face portion of the frame via a lower-support portion thereof,
wherein said frame has a windshield support portion supporting the lower side portion of the windshield at part of the upper face portion thereof, said front and rear upper-support portions of the support member are positioned away from each other in the vehicle longitudinal direction, and the windshield support portion of said frame is positioned between the front and rear upper-support portions of said support member in the vehicle longitudinal direction; and
wherein said support member is comprised of a plate member which is arranged such that a direction of plate thickness thereof is parallel to the vehicle width direction.

2. The support structure of a windshield of claim 1, wherein said support member is comprised of substantially a flat-shaped plate member extending straightly in a vertical direction in an elevational view.

3. The support structure of a windshield of claim 1, wherein the upper face portion of said frame includes a first wall portion to which the rear upper-support portion of said support member is attached and a second wall portion which extends forward from the first wall portion and to which the front upper-support portion of said support member is attached, a bending portion is formed at a connection portion of said first wall portion and said second wall portion of the frame, and said bending portion of the frame is positioned between the front and rear upper-support portions of said support member in the vehicle longitudinal direction.

4. The support structure of a windshield of claim 3, wherein said windshield support portion of the frame is formed by part of a rear side portion of said second wall portion, said front upper-support portion of the support member is attached to a portion of the second wall portion which is positioned in front of the windshield support portion of the frame, and said portion of the second wall portion to which the front upper-support portion of the support member is attached is formed at a level which is located below said windshield support portion of the frame.

5. The support structure of a windshield of claim 1, wherein said support member has a frame portion extending obliquely rearward and downward from the upper face portion to the lower face portion of said frame, and an extension direction of said frame portion of the support member matches an input direction of a load caused by a film vibration of the windshield.

6. The support structure of a windshield of claim 1, wherein the upper face portion of said frame includes a first wall portion to which the rear upper-support portion of said support member is attached, a second wall portion which extends forward from the first wall portion and to which the front upper-support portion of said support member is attached, and a third wall portion which extends downward from a rear end portion of the first wall portion and is formed at a position which is located in back of a rear side portion of the support member.

7. The support structure of a windshield of claim 1, wherein the upper face portion of said frame includes a first wall portion to which the rear upper-support portion of said support member is attached, a second wall portion which extends forward from the first wall portion and to which the front upper-support portion of said support member is attached, and a third wall portion which extends downward from a rear end portion of the first wall portion, and a bending portion is formed at a connection portion of said first wall portion and said third wall portion of the frame.

8. The support structure of a windshield of claim 7, wherein said support member includes a rear frame portion extending obliquely forward and downward from the rear upper-support portion with a gap formed vertically between said third wall portion of the frame and said rear frame portion, and a front frame portion extending downward from the front upper-support portion.

9. The support structure of a windshield of claim 1, wherein the upper and lower face portions of said frame are respectively of a cowl panel and a dash upper panel, the front and rear upper-support portions of said support member are respectively attached to front and rear points of the cowl panel which are located above a level of a connection portion of the cowl panel and the dash upper panel, and said lower-support portion of the support member is attached to a portion of the dash upper panel which is located below the level of said connection portion of the cowl panel and the dash upper panel.

10. The support structure of a windshield of claim 9, wherein said support member is provided at a middle position, in the vehicle width direction, of said frame, a pair of assistant members is provided at both side portions of the frame which are positioned on the outside, in the vehicle width direction, of the support member, each of the assistant members including a lower end portion attached to the connection portion of the cowl panel and the dash upper panel and an upper end portion attached to a portion of the cowl panel which is located above the level of the connection portion of the cowl panel and the dash upper panel.

11. The support structure of a windshield of claim 10, wherein said assistant member is comprised of another plate member which is arranged such that a direction of plate thickness thereof is perpendicular to the vehicle width direction.

12. The support structure of a windshield of claim 1, wherein said support member has a bending portion at a middle position thereof in a vertical direction such that the support member bends in the vehicle width direction at the bending portion when an impact load is inputted to the windshield from above.

13. The support structure of a windshield of claim 1, wherein said upper face portion of the frame includes a first wall portion to which said rear upper-support portion of the support member is attached and a second wall portion which extends forward from the first wall portion and to which said front upper-support portion of the support member is attached, and a bending portion is formed at a connection portion of said first wall portion and said second wall portion of the frame by the second wall portion being configured to extend obliquely downward and forward from the first wall portion, whereby a space is formed between the front and rear upper-support portions of the support member below said windshield support portion of the frame such that the windshield support portion of the frame is deformable downward when the windshield receives an impact load from above in a vehicle frontal collision.

* * * * *